3,474,077
PROCESS FOR THE VULCANIZATION OF POLYMERS

Raymond T. Woodhams, Toronto, Ontario, Canada, assignor to The Dunlop Company Limited, London, England, a British company
No Drawing. Filed June 17, 1966, Ser. No. 558,552
Claims priority, application Great Britain, July 10, 1965, 29,337/65
Int. Cl. C08g 23/20
U.S. Cl. 260—79.5                    13 Claims

ABSTRACT OF THE DISCLOSURE

Synthetic polymers having ether or thioether linkages are vulcanized in the temperature range 220°–450° F. using as a vulcanizing agent an organic compound of the formula RHNCSS⁻·⁺NH$_3$R$^1$, in which R and R$^1$ each represent a group selected from the class consisting of alkyl, aralkyl, aryl and a group wherein R and R$^1$ taken together form at least part of a cyclic compound in the proportions of 1–10 parts agent per 100 parts polymer. Preferred agents include methyl ammonium methyl dithiocarbamate, isopropyl ammonium isopropyl dithiocarbamate, methyl ammonium isopropyl dithiocarbamate and n-butyl ammonium n-butyl dithiocarbamate.

---

This invention relates to to process for the vulcanization of polymers and particularly to a process for the vulcanization of unsaturated polymers containing ether or thioether linkages, and to vulcanized polymers when produced by the process.

According to the present invention, a process for the vulcanization of an unsaturated polymer containing ether or thioether linkages comprises heating the polymer in the presence of, as vulcanizing agent, an organic compound having the general formula RHN·CSS⁻·⁺NH$_3$R$^1$, wherein each R group represents an alkyl group, an aralkyl group or an aryl group, or wherein R and R$^1$, when taken together, form at least part of a cyclic compound.

According to the present invention also, there is provided a vulcanized polymer when produced by the process according to the immediately-preceding paragraph.

The vulcanizing agents which may be used have the specified formula, and it is preferred to use a compound in which at least one of said groups R and R$^1$ is an alkyl, aryl or aralkyl group. The compounds are salts of N-substituted dithiocarbamic acids, and examples of suitable compounds are methyl ammonium methyl dithiocarbamate, isopropyl ammonium isopropyl dithiocarbamate, methyl ammonium isopropyl dithiocarbamate and n-butyl ammonium n-butyl dithiocarbamate. The groups R and R$^1$ may belong to the same organic system, and an example of such a compound is the reaction product of ethylenediamine and carbon disulphide having the general formula (—CH$_2$NH·CSS⁻·⁺NH$_3$CH$_2$—)$_n$ which may have a cyclic or linear form and which is probably a mixture of both forms.

The characteristic feature of the vulcanizing agents is that they liberate hydrogen sulphide when heated. The temperature at which the liberation occurs will be different for different agents, and therefore the temperature at which the polymer is heated to effect vulcanization is dependent to some extent upon the particular vulcanizing agent used. For example, methyl ammonium methyldithiocarbamate liberates hydrogen sulphide at a temperature lower than the temperature at which n-butyl ammonium n-butyl dithiocarbamate liberates hydrogen sulphide. However, although the temperature used for vulcanizing the polymer can vary over a wide range depending upon the particular vulcanizing agent used, temperatures of from 220° F. to 450° F., and preferably from 270° F. to 340° F., will usually be employed.

The amount of the vulcanizing agent used can vary over a wide range depending upon the desired rate of vulcanization of the polymer, but amounts of from 1 to 10 parts by weight of the agent per 100 parts of the polymer are usually used. Preferably, the amount is from 3 parts to 6 parts by weight per 100 parts of the polymer.

The polymers which can be vulcanized by the process of the present invention are those polymers which contain unsaturation and which also contain ether or thioether linkages. Examples of such polymers are copolymers of one or more saturated episulphides or epoxides such as alkylene sulphides or oxides, e.g., ethylene sulphide, propylene sulphide, propylene oxide or butylene sulphide, with unsaturated episulphides or epoxides, e.g., allyloxy propylene episulphide (or allyl thioglycidyl ether) vinyl thiurane, 1,5-hexadiene monoepisulphide, dimethyl butadiene monoepisulphide, piperylene monoepisulphide, allyl glycidyl ether, 1,4 - pentadiene monoepisulphide cyclopentadiene monoepisulphide, limonene monoepisulphide, 1,3 - cyclohexadiene monoepisulphide, 1,4-dimethyl cyclohexane monoepisulphide, thioglycidyl methacrylate, thioglycidyl acrylate and similar epoxides.

The amount of unsaturated monomer units present in the copolymer can be from 0.1 to 20 mole percent of the total polymer but will usually be from 1 to 10 mole percent of the polymer. To some extent the amount used depends upon the type of polymer desired.

Polymers particularly suitable for use in the present invention are unsaturated copolymers of propylene oxide or propylene sulphide. The polymer composition may, if desired, contain inert fillers such as carbon black, silica and whiting, and the amount of the filler is not critical. The filler (if present) and the vulcanizing agent can be incorporated into the polymer composition using conventional equipment such as a mill or a Banbury mixer. Vulcanization can be effected by heating the polymer composition in a press.

Hitherto, it has been the practice to vulcanize unsaturated polymer compositions using sulphur as the vulcanizing agent, with the result that the vulcanized compositions exhibited high compression set values. The process according to the present invention enables the polymers to be vulcanized in the absence of sulphur to yield vulcanized polymers having lower compression set values. However, it is to be understood that the polymers can be vulcanized according to the method of the present invention in the presence of sulphur in addition to the salt of dithiocarbamic acid. The resulting vulcanized polymer will not, of course, have such a low compression set value as a polymer vulcanized in the absence of sulphur.

The invention is illustrated by the following examples in which all "parts" are parts by weight:

EXAMPLE I

This example illustrates the vulcanization of an unsaturated terpolymer of propylene sulphide in the absence of sulphur. The terpolymer contained propylene sulphide (68 mole percent), ethylene sulphide (26 mole percent) and allyloxy propylene episulphide (6.0 mole percent).

100 parts of the terpolymer were compounded with 5 parts of zinc oxide, 40 parts of H.A.F. carbon black and 6 parts of n-butyl ammonium n-butyl dithiocarbamate, and the resulting composition was heated at 307° F. for 60 minutes to vulcanize the terpolymer. The following physical properties of the vulcanized composition were measured:

Modulus at 100 percent elongation in pounds per square inch (M 100)

Modulus at 300 percent elongation in pounds per square inch (M 300)
Tensile strength (T.S.) in pounds per square inch.
Percentage elongation at break (% E).
Percentage set at break (S).
Hardness (Shore A) (H)
Compression set (C.S.) measured at 158° F. after treating for 22 hours The above procedure was repeated six times (Experiments 2 to 7), except that the n-butyl ammonium n-butyl dithiocarbamate was replaced by the vulcanizing agents shown below.

Experiment No.: Vulcanizing agent
2 ____ Isopropyl ammonium isopropyl dithiocarbamate.
3 ____ Methyl ammonium methyl dithiocarbamate.
4 ____ —(CH$_2$NH·CSS−·+NH$_3$CH$_2$—)$_n$.
5 ____ Ammonium salt of phenyl dithiocarbamic acid.
6 ____ Ammonium dithiocarbamate.
7 ____ Dimethyl ammonium dimethyl dithiocarbamate.

(—CH$_2$NH·CSS−·+NH$_3$CH$_2$—)$_n$ is the reaction product of ethylenediamine and carbon disulphide.

The physical properties of the vulcanized compositions are shown in Table I.

TABLE I

| | M 100 | M 300 | T.S. | %E | S | H | C.S. |
|---|---|---|---|---|---|---|---|
| Expt. No.: | | | | | | | |
| 1 | 500 | | 1,140 | 190 | 5 | 68 | 19 |
| 2 | 500 | | 1,240 | 230 | 10 | 69 | |
| 3 | 160 | 520 | 600 | 370 | 17 | 48 | |
| 4 | 640 | | 1,000 | 150 | 5 | 75 | 15 |
| 5 | Slight cure—Properties not measured | | | | | | |
| 6 | No Cure | | | | | | |
| 7 | No Cure | | | | | | |

Experiments 1, 2 and 3 were then repeated (Experiments 8 to 10) except that in each experiment the zinc oxide was omitted. The results are shown in Table IA.

TABLE IA

| | M 100 | T.S. | %E | S | H | C.S. |
|---|---|---|---|---|---|---|
| Expt. No.: | | | | | | |
| 8 | 480 | 1,080 | 180 | 5 | 71 | 27 |
| 9 | 580 | 1,120 | 170 | 5 | 77 | 43 |
| 10 | 680 | 940 | 140 | 2 | 73 | 39 |

These results show that compounds having the general formula RHN·CSS−·+NH$_3$R where R is an alkyl group are effective vulcanizing agents for the polymer in the absence of sulphur, and that zinc oxide has no appreciable effect upon the properties of the vulcanizate although it does tend to result in a lower rate of vulcanization.

EXAMPLE II

This example compares the properties of a composition vulcanized using a sulphur cure with the properties of a composition vulcanized in the absence of sulphur.

Five compositions were prepared according to the following formulae, in which the polymer is the same as in Example I.

| | Composition (parts) | | | | |
|---|---|---|---|---|---|
| | A | B | C | D | E |
| Polymer | 100 | 100 | 100 | 100 | 100 |
| Stearic Acid | 2 | 2 | 2 | 2 | 2 |
| Zinc oxide | 5 | | | | |
| HAF carbon black | 50 | 50 | 50 | 50 | 50 |
| Sulphur | 2 | | | | |
| Tetramethyl thiuram disulphide | 1 | | | | |
| Mercaptobenzthiazole | 0.5 | | | | |
| Agent 1 | | 6 | | | |
| Agent 2 | | | 6 | | |
| Agent 3 | | | | 6 | |
| Agent 4 | | | | | 6 |

Agent 1 is n-butyl ammonium n-butyl dithiocarbamate.
Agent 2 is (—CH$_2$HN·CSS−·+NH$_3$CH$_2$—)$_n$.
Agent 3 is isopropyl ammonium isopropyl dithiocarbamate.
Agent 4 is methyl ammonium methyl dithiocarbamate.

Each composition was vulcanized for the times shown in Table II below at 307° F., and the physical properties of each vulcanizate were measured. In Table II, time represents the cure time in minutes.

TABLE II

| | Property | | | | | | |
|---|---|---|---|---|---|---|---|
| Time | M 100 | M 300 | T.S. | %E | H | S | C.S. |
| Composition A: | | | | | | | |
| 10 | 400 | 1,260 | 1,620 | 410 | 75 | 35 | |
| 20 | 560 | | 1,700 | 290 | 79 | 20 | 33 |
| 30 | 600 | | 1,500 | 230 | 78 | 15 | |
| 60 | 540 | | 1,300 | 220 | 77 | 15 | |
| Composition B: | | | | | | | |
| 10 | 360 | 1,160 | 1,580 | 450 | 72 | 25 | |
| 20 | 480 | | 1,560 | 290 | 74 | 10 | 32 |
| 30 | 580 | | 1,500 | 230 | 74 | 10 | 32 |
| 60 | 700 | | 1,420 | 190 | 76 | 10 | |
| Composition C: | | | | | | | |
| 10 | 380 | 1,160 | 1,400 | 360 | 71 | 25 | |
| 20 | 580 | | 1,420 | 230 | 76 | 10 | 28 |
| 30 | 820 | | 1,340 | 170 | 79 | 7.5 | |
| 60 | 920 | | 1,200 | 130 | 82 | 5 | |
| Composition D: | | | | | | | |
| 10 | 400 | 1,260 | 1,500 | 390 | 75 | 22 | |
| 20 | 500 | | 1,260 | 220 | 78 | 10 | |
| 30 | 560 | | 1,460 | 230 | 77 | 12 | 39 |
| 60 | 760 | | 1,380 | 170 | 81 | 7 | |
| Composition E: | | | | | | | |
| 10 | 520 | | 1,420 | 250 | 74 | 10 | |
| 20 | 760 | | 1,360 | 160 | 73 | 5 | |
| 30 | 940 | | 1,260 | 130 | 76 | 2 | 33 |
| 60 | | | 760 | 50 | 78 | 2 | |

These results show that the compression set values of the vulcanizates obtained in the absence of sulphur are considerably lower than those of the vulcanizate obtained in the presence of sulphur.

EXAMPLE III 100 parts of a polymer, similar to the polymer used in Example I but containing 6.7 mole per cent unsaturation due to allyloxy propylene episulphide, were compounded with 50 parts of HAF carbon black and 6 parts of isopropyl ammonium isopropyl dithiocarbamate.

This composition (Composition F) was cured at 307° F. for the cure times in minutes shown in Table III below, in which the properties of the vulcanizates are also shown.

The experiment was then repeated using 4 parts instead of 6 parts of the vulcanizing agent (Composition G) and then 2 parts instead of 6 parts of the agent (Composition H).

TABLE III

| | Property | | | | | | |
|---|---|---|---|---|---|---|---|
| Cure Time | M 100 | M 300 | T.S. | %E | H | S | C.S. |
| Composition F: | | | | | | | |
| 10 | 520 | | 1,420 | 250 | 74 | 10 | |
| 20 | 760 | | 1,360 | 160 | 77 | 5 | |
| 30 | 940 | | 1,260 | 130 | 79 | 2 | 34 |
| Composition G: | | | | | | | |
| 10 | 400 | 1,260 | 1,460 | 340 | 70 | 15 | |
| 20 | 540 | | 1,420 | 220 | 73 | 10 | |
| 30 | 680 | | 1,280 | 180 | 76 | 5 | 31 |
| Composition H: | | | | | | | |
| 10 | 120 | 300 | 500 | 530 | 65 | 55 | |
| 20 | 180 | 580 | 800 | 420 | 67 | 30 | |
| 30 | 260 | 1,300 | 1,440 | 320 | 68 | 20 | |
| 60 | 320 | | 1,160 | 290 | 71 | 17 | 26 |

These results show that satisfactory vulcanizates can be obtained using the vulcanizing agent in an amount as low as 2 parts per 100 parts of the polymer, but that naturally the rate of vulcanization decreases as the amount of the vulcanizing agent decreases.

EXAMPLE IV

This example illustrates the vulcanization of a polymer composition which contains an inert filler.

Four compositions (A, B, C and D) were prepared from the polymer used in Example I according to the following formulae:

| Ingredients | Composition (Parts) | | | |
|---|---|---|---|---|
| | A | B | C | D |
| Polymer | 100 | 100 | 100 | 100 |
| Stearic Acid | | 2 | 2 | 2 |
| Diethylene glycol | | 3.5 | | |
| Hi-Sil 233 | | 54 | | |
| Whiting | | | 75 | |
| HAF carbon black | | | | 50 |
| Agent | 6 | 6 | 6 | 6 |

The agent is isopropyl ammonium isopropyl dithiocarbamate. Hi-Sil 233 is a precipitated hydrated silica of fine particle size containing approximately 87.5 percent by weight of silicon dioxide.

Each composition was vulcanized for 30 minutes at 307° F., and the physical properties of the vulcanizates were measured and are shown in Table IV:

TABLE IV

| | Property | | | | |
|---|---|---|---|---|---|
| | M 100 | T.S. | %E | H | S |
| Composition: | | | | | |
| A | 180 | 240 | 130 | 51 | 2 |
| B | 1,080 | 1,960 | 210 | 90 | 10 |
| C | | 160 | 80 | 56 | 2 |
| D | 940 | 1,260 | 180 | 76 | 5 |

EXAMPLE V

This example illustrates the vulcanization of an unsaturated copolymer of propylene oxide. The copolymer contained allyl glycidyl ether to confer unsaturation on the copolymer.

100 parts of the copolymer were compounded with 50 parts of HAF carbon black, 2 parts of stearic acid, 5 parts of zinc oxide and 4 parts of isopropyl ammonium isopropyl dithiocarbamate. The composition was vulcanized at 307° F. for 35 minutes. The properties of the vulcanizate are shown in Table V:

| | |
|---|---|
| M 100 | 360 |
| M 300 | 1280 |
| T.S. | 1880 |
| Percent E. | 450 |
| H | 61 |
| S | 10 |
| C.S. | 9 |

This compression set value is considerably lower than the value for compositions cured in the presence of sulphur.

EXAMPLE VI 100 parts of the polymer used in Example III were compounded with 50 parts of HAF carbon black, 2 parts of stearic acid and 6 parts of isopropyl ammonium isopropyl dithiocarbamate (Composition A).

Two further compositions (B and C) were prepared as above except that 5 parts of zinc oxide were included in Composition B and 5 parts of zinc sulphide were included in Composition C.

The compositions (A, B and C) were each vulcanized at 307° F. for 50 minutes, 25 minutes and 20 minutes, respectively, and the properties of each vulcanizate were measured and are shown in Table VI:

TABLE VI

| | Property | | | | |
|---|---|---|---|---|---|
| | M 100 | T.S. | %E | S | H |
| Composition: | | | | | |
| A | 400 | 1,260 | 260 | 5 | 69 |
| B | 160 | 600 | 670 | 17 | 48 |
| C | 720 | 1,000 | 130 | 5 | 69 |

It was found that zinc oxide reduced the rate of vulcanization, whereas zinc sulphide had very little effect.

Having now described my invention, what I claim is:
1. A process for the vulcanization of an unsaturated copolymer selected from the class consisting of copolymers of at least one of saturated alkylene sulphides and saturated alkylene oxides and one of allyl glycidyl ether and unsaturated episulphides selected from the group consisting of allyloxy propylene episulphide, vinyl thiurane, 1,5-hexadiene, monoepisulphide, dimethyl butadiene monoepisulphide, piperylene monoepisulphide, 1,4-pentadiene monoepisulphide, cyclopentadiene monoepisulphide, limonene monoepisulphide, 1,3- cyclohexadiene monoepisulphide, 1,4-dimethylene cyclohexane monoepisulphide, thioglycidyl methacrylate and thioglycidyl acrylate which comprises heating said polymer in the absence of sulfur and in the presence of at least 1 part per 100 parts of said copolymer of a vulcanizing agent up to the temperature at which said vulcanizing agent liberates hydrogen sulphide, said vulcanizing agent consisting essentially of an organic compound of the formula

$$RHNCSS^{-}\cdot{}^{+}NH_3R^1$$

in which R and $R^1$ each represent a group selected from the class consisting of alkyl, aralkyl, aryl and a group wherein R and $R^1$ taken together form at least part of a cyclic compound.

2. A process according to claim 1 in which the polymer is heated with said vulcanizing agent up to a temperature of from 220° F. to 450° F.

3. A process according to claim 2 in which the polymer is heated with said vulcanizing agent up to a temperature of from 270° F. to 340° F.

4. A process according to claim 1 in which the amount of vulcanizing agent is from 1 to 10 parts by weight of agent per 100 parts of polymer.

5. A process according to claim 4 in which the amount of vulcanizing agent is from 3 to 6 parts by weight of agent per 100 parts of polymer.

6. A process according to claim 1 in which the vulcanizing agent is methyl ammonium methyl dithiocarbamate.

7. A process according to claim 1 in which the vulcanizing agent is isopropyl ammonium isopropyl dithiocarbamate.

8. A process according to claim 1 in which the vulcanizing agent is methyl ammonium isopropyl dithiocarbamate.

9. A process according to claim 1 in which the vulcanizing agent is n-butyl ammonium n-butyl dithiocarbamate.

10. A process according to claim 1 in which the vulcanizing agent is the reaction product of ethylenediamine and carbon disulphide.

11. A process according to claim 1 in which the polymer is an unsaturated copolymer of propylene oxide.

12. A process according to claim 1 in which the polymer is an unsaturated copolymer of propylene sulphide.

13. The process according to claim 1 wherein R and $R^1$ each represent a group selected from the class consisting of alkyl and the group wherein R and $R^1$ taken together form at least part of a cyclic compound.

References Cited

UNITED STATES PATENTS

| 2,193,773 | 3/1940 | Sloan | 260—793 |
| 2,421,352 | 5/1947 | Paul et al. | 260—79.3 |
| 2,604,462 | 7/1952 | Mathes | 260—79.5 |
| 3,031,439 | 4/1962 | Bailey | 260—79.5 |
| 3,222,326 | 12/1965 | Broadway | 260—79.5 |
| 2,905,655 | 9/1959 | Albert | 260—793 |
| 3,206,417 | 9/1965 | Waterman et al. | 260—793 |

JAMES A. SEIDLECK, Primary Examiner

U.S. Cl. X.R.

260—41, 23, 79.7